Figure 1:
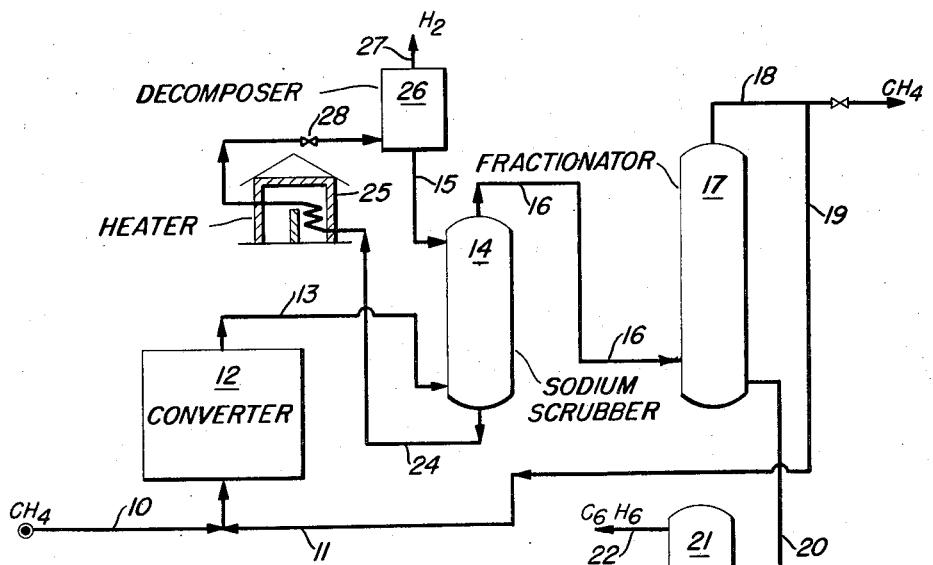

Dec. 16, 1958 J. W. MOHLMAN 2,864,671
PROCESS OF HYDROGEN RECOVERY
Filed June 30, 1954

INVENTOR.
John W. Mohlman
BY
Arthur J. Gilkes
ATTORNEY

United States Patent Office 2,864,671
Patented Dec. 16, 1958

2,864,671

PROCESS OF HYDROGEN RECOVERY

John William Mohlman, Chicago, Ill., assignor to Standard Oil Company, Chicago, Ill., a corporation of Indiana Application June 30, 1954, Serial No. 440,355

7 Claims. (Cl. 23—212)

This invention relates to recovery of substantially pure hydrogen from dilute hydrogen containing gas streams typified by the gaseous conversion products of thermal conversion processes operating on hydrocarbon feed stocks.

In many thermal cracking processes where hydrocarbons are cracked at high severities to produce high yields of unsaturates such as olefins or aromatics, there are difficult hydrogen separation problems which add disproportionately to the cost of the process or even may make the process commercially infeasible. For example, in the production of ethylene by cracking ethane or propane, the operation of the demethanizing tower is a critical factor in the performance and economics of the product fractionating system. In the production of aromatics from hydrocarbon gases, processes for the pyrolysis of methane, the cheapest and most abundant of light petroleum gases, have often been proposed, but such processes have always appeared to be border-line in terms of economic feasibility because of the difficult separation of the large amounts of hydrogen produced from unreached methane as an ancillary to product recovery. On the other hand, methane pyrolysis represents a tremendous potential source of hydrogen provided its separation from the conversion mixture were feasible by less expensive methods than available methods such as hypersorption, i. e. activated charcoal adsorption, and refrigerated super fractionation or oil absorption methods.

An additional difficult and costly problem in the recovery of useful products from processes for thermal conversion of hydrocarbon feed stocks at high severity is the formation of tars and oils unless the conversion is quenched immediately and effectively as the charge leaves the conversion zone. The formation of tars and oils not only reduces the yields of desired products but may result in the formation of fogs and mists which complicate and greatly increase the expense of product recovery. When water is used as a quench, as is usual, the gaseous products of the conversion are saturated with water vapor which must be removed prior to subsequent low temperature fractionation of the gas mixture in order to prevent interference with efficiency by reason of ice and hydrate formation. Thus, in the production of ethylene by gas cracking, several alumina traps must be employed to eliminate all traces of water in the gas stream passing to the fractionation system.

My invention provides means for effecting chemical separation of substantially pure hydrogen from dilute hydrogen gas streams from thermal conversion processes. It also provides means for simultaneously quenching the hot gaseous conversion products and for chemically separating hydrogen in a state of high purity. According to the invention, the dilute or impure hydrogen containing gas stream is contacted with a molten metal capable of forming an equilibrium metal hydride under the contact conditions by regulating the temperature-pressure relationship to provide a temperature less than the decomposition temperature of the metal hydride at the prevailing hydrogen partial pressure. After the unabsorbed portion of the gas stream has been separated, the molten metal-metal hydride equilibrium mixture is treated for hydrogen recovery by adjusting the temperature-pressure relationship to provide a temperature greater than the decomposition temperature at the prevailing hydrogen pressure.

Referring to the accompanying drawings which illustrate specific embodiments of the invention in the form of diagrammatic process flow plans, the invention will be described in further detail.

Of the drawings, Figure 1 is a simplified generalized flow plan of a gas cracking process in which hydrogen separation according to the invention is provided.

Figure 2:
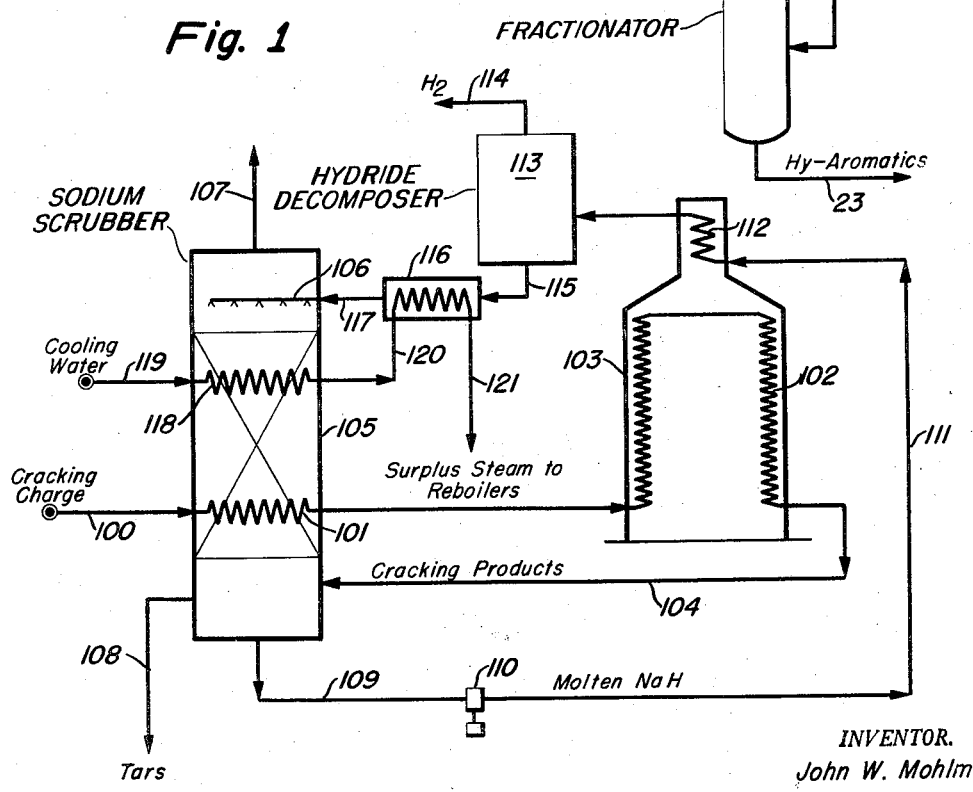

Figure 2 shows a simplified flow plan of a process for producing ethylene by thermal cracking of ethane.

In Figure 1, the charge, methane for example, is charged by line 10 together with recycle methane from line 11 to convertor 12 which may be for example, a cracking furnace of the regenerative type such as a refractory checker-work furnace or a pebble heater operated on alternate cracking and burning cycles. The conversion products from convertor 12 are passed by line 13 to sodium scrubber 14. A contact medium comprising molten sodium is introduced at the top of scrubber 14 from line 15 and passes downward through the tower in counter-current contact with the entering gaseous conversion products. Unabsorbed conversion products pass overhead via line 16 to fractionator 17. Fractionator 17 may take the form of a demethanizing still or an oil absorption tower. Methane overhead from line 18 advantageously is recycled to convertor 12 via line 19. The demethanized fraction is removed as bottoms from fractionator 17 via line 20 to fractionator 21 where, for example, benzene may be taken overhead as a light product as indicated by connection 22 and a heavy aromatics fraction may be recovered as bottoms as by connection 23.

Returning to the sodium scrubber 14, the molten metal-molten hydride equilibrium mixture withdrawn from the bottom of scrubber 14 is passed by line 24 through the coil of heater 25 and is introduced into decomposing drum 26. Hydrogen released in decomposer drum 26 is recovered through line 27, and molten contact metal is recycled to scrubber 14 by means of line 15.

In the operation of the system of Figure 1, it is advantageous to use the molten sodium contact medium as a quench as well as hydrogen absorption means. The molten stream from decomposer drum 26 therefore is advantageously cooled in a cooler (not shown) to a temperature substantially below the temperature level in the conversion zone and which, allowing for temperature rise through the exothermic heat released by hydrogen absorption in scrubber 14, will result in an outlet temperature less than the decomposition temperature for metal hydride in the scrubbing medium at the hydrogen partial pressure prevailing at the bottom of scrubber 14. Heat for the reverse hydride decomposition reaction is supplied to the molten stream withdrawn from scrubber 14 in fired heater 25. Further adjustment in the temperature-pressure relationship as may be required in decomposer 26 may be provided through the operation of pressure reduction valve 28. The essential control operation is to provide a temperature pressure relationship in decomposer 26 so that the temperature exceeds the decomposition temperature at the prevailing hydrogen pressure.

In the process illustrated in Figure 2, ethane or propane charge in line 100 is passed through preheater coil 101 to the heating coil 102 of cracking furnace 103. Cracked products from cracking furnace 103 flow through line 104 into a lower portion of sodium scrubber 105. Cool molten sodium is introduced into an upper portion of scrubber 105 by means of spray 106 so that it passes downwardly through the tower in counter-current contact with the incoming gaseous cracking products. Simultaneously, the cracking reaction is quenched and hydrogen is absorbed from the mixture of gaseous cracking products. Unabsorbed cracking products pass from the top of scrubber 105 via connection 107 to be conducted to the usual recovery system. By holding a regulated liquid level for the molten metal collecting in the bottom of scrubber 105, tars and carbonaceous residues may be skimmed off as indicated by connection 108. The molten metal and metal hydride phase is withdrawn from the bottom of scrubber 105 by means of line 109 and is pumped by a molten metal pump, as indicated diagrammatically at 110 through line 111 and coil 112 situated in the exhaust section of cracking furnace 103 to decomposer drum 113.

Hydrogen released in decomposer 113 is recovered by overhead line 114, and the resulting molten metal stream is recirculated to scrubber 105 via connection 115, cooler 116 and connection 117. Further temperature control in scrubber 105 may be provided by means of cooling coil 118 through which cooling water is circulated by means of line 119 and thence through cooler 116 through lines 120 and 121.

In a specific example illustrating the operation of the ethylene cracking system shown in Figure 2, the ethane charge is preheated to 950° F. in preheating coil 101 and then is subjected to an average temperature of about 1200° F. in a cracking furnace for about 1 second of contact time. The molten sodium contact medium is sprayed into the top of tower 105, advantageously after cooling to a temperature close to the melting point. About 1 atmospheric pressure of hydrogen exists over sodium hydride at about 800° F. The combined heat absorbed from the exothermic hydrogen absorption occurring in scrubber 105 and the heat input in regenerator coil 112 are controlled to provide a temperature exceeding 800° F. upon flashing into decomposer 113.

When the process of my invention is applied to ethylene cracking, only an insignificant amount of hydrogen need be carried over with the unabsorbed cracking products to the ethylene recovery system. As a consequence, the demethanizer fractionating column can be operated more efficiently and economically than in the conventional system. Ordinarily about 4 mol percent ethylene must be discarded from the top of the demethanizer in order to permit the $H_2$-$CH_4$ gas to be partially liquefied for reflux. It is impractical to raise the tower pressure without exceeding critical conditions in the tower bottoms, and it is impossible to lower the temperature below −130° F. when using −140° F. to −145° F. liquid ethylene refrigerant. Thus a low temperature plant ordinarily must lose about 6.5% of the available ethylene because of conditions in the top of the demethanizer. The method of my invention in comparison to conventional separation of hydrogen reduces refrigeration cost for the demethanizer column by about 5% and increases ethylene yield by about 6%.

In addition, the use of the molten sodium stream as reaction quench produces significant advantages because water-free gas is charged to the ethylene recovery system. Usually extensive alumina dehydration is required to eliminate all traces of water to prevent tower plugging by ice crystals. Moreover, quench water forms an emulsion with the tars from cracking ethane or propane which presents a severe problem in separation and disposal. If a closed cycle cooling water circuit is used, the cooling tower requires periodic cleaning to prevent buildup of tars. If quenched water is discharged to streams a pollution problem is unavoidable.

In the practice of the invention, sodium is the metal best meeting the practical requirements of the process. Sodium forms sodium hydride readily by direct combination with hydrogen at a pressure ranging from about 15 p. s. i. a. at 800° F. to about 1000 p. s.i. a. at about 1100° F. in a reversible equilibrium reaction controllable by the relationship between the temperature and the hydrogen pressure. The decomposition pressure (or temperature) of sodium hydride can be calculated from the following equation. (See Journal of the American Chemical Society, vol. 34, pg. 779 (1912).)

$$\log_{10} p = -\frac{5700}{T} + 2.5 \log_{10} T + 3.956$$

where $p$ is the pressure in millimeters and T is the temperature in degrees Kelvin. The equation was derived theoretically and checked with observed pressures up to one atmosphere. Although relatively high pressures may be encountered under the conditions of the invention, the equation has been found to give reasonably accurate results when compared with data obtained at high pressures.

In controlling the operation of the sodium scrubber or absorption zone and that of the hydride decomposition zone several factors should be observed. The temperature in the absorption zone must be less than the decomposition temperature at a hydrogen partial pressure of the conversion which prevails in the absorption zone. The temperature in the decomposition zone must be higher than the decomposition temperature at the hydrogen pressure prevailing that zone. To facilitate handling the contact material, the extent of hydride formation is desirably limited to a concentration of sodium hydride in molten sodium corresponding to the solubility limit of the hydride since the latter is normally a solid at temperatures below the decomposition point. In the temperature regions of interest to the invention, the solubility limit of the hydride in molten sodium appears to be approximately 28%. It is possible, however, to exceed the solubility to some extent by handling the mixture as a fluid slurry of hydride and molten sodium.

Experimental work has shown that the pressure-temperature relationship for hydride decomposition is affected by the composition of the hydride-metal system and that for a given temperature, the decomposition pressure is lower for more dilute hydride systems. Since the reaction of sodium with hydrogen has bene found to be retarded by formation of a crust of sodium hydride on the surface of the molten sodium, it is further desirable to provide equipment promoting good contact between the molten contact material and the conversion effluent in order to avoid handling too dilute a hydride system in the decomposition zone.

A number of other alkali and alkaline earth metals form equilibrium hydrides with hydrogen at elevated temperature and pressure and therefore appear suitable for use alone or in admixture with each other. For example, lithium, lithium-aluminum, calcium and barium are capable of forming equilibrium metal hydrides. The metals may be employed in the molten state as such or in solution in fused salt melts such as an eutectic melt composed of 40% potassium chloride and 60% lithium chloride, for example, which has a melting point of 666° F. Because of its availability, its low melting point (207° F.) and its equilibrium characteristics, however, sodium is the most practical choice.

The carry-over of sodium vapor from the decomposer ordinarily is insignificant. For example, at 1000° F., the sodium vapor pressure is only about 0.1 p. s. i. a. The sodium content can be reduced as desired by cooling. Alternatively, if the hydrogen product stream is to be used hot, it can be scrubbed against an acidic substance such as silica gel or other sodium active compounds such as sulfur compounds in high sulfur hydrocarbon stocks.

In order to prevent buildup of contaminants such as sodium sulfide, sodium oxide and/or sodium hydroxide in the circulating melt system, it may be advantageous where the feed gas contains appreciable amounts of sulfur or oxygen containing impurities to operate a 2-stage process for contacting the hydroformer effluent. Thus, in the first stage, the effluent may be contacted with molten sodium at a temperature above the decomposition temperature at the prevailing hydrogen partial pressure so that sodium hydride is not formed but impurities in the raw gas are converted to insoluble compounds such as sodium sulfide and sodium oxide. The solid impurities are separated from the circulated molten sodium so that circulation of clean sodium-sodium hydride can be effected between the hydrogen absorption zone and the hydride decomposition zone. This is particularly important when hydride concentrations are carried into the range producing slurries rather than solutions. The preliminary scrubber may be operated with advantage using metals of lower cost then sodium in terms of cost of metal per unit weight of impurity removed. For example, fused eutectic mixtures of molten metals such as aluminum, lead, magnesium and the like may be employed under reforming conditions of temperature and pressure. For example, a eutectic mixture of aluminum and magnesium containing from 35–65% magnesium melts at 815°–845° F. which is a convenient temperature range for handling liquid metals. Hydrogen sulfide, water vapor and other impurities are chemically reacted out of the reforming effluent to form solid sulfides and oxides of aluminum and magnesium. The resulting oxides and sulfides are separated from the liquid metals and make-up metals are added in the proper proportions to maintain the circulating low melting eutectic.

Hence, my invention provides means for separating substantially pure hydrogen from dilute hydrogen containing gas streams derived from a variety of conversion processes. The invention is applied with special advantage in gas cracking processes of severity designed to produce high yields of unsaturated products where separation of hydrogen from methane presents a difficult problem and where the effluent from the cracking reactor must be complete and effectively quenched to minimize coking and tar formation. The invention may be readily adapted however to other conversion processes, for example, partial combustion processes as are employed in the production of carbon black from hydrocarbon gas or oil stocks. The specific procedures and conditions for conducting the conversion processes and the processes for ultimate product recovery are well known in the art and are not described because they form no part of the present invention except as they may be combined with it in an integrated process. The invention also provides means for producing a substantially pure hydrogen stream from methane by thermal cracking at high severity where high purity hydrogen is required in very large quantities as for refinery hydrogenation processes and where by-product hydrogen is insufficient or unavailable. By selecting the severity level as is known in the art in the region of about 1400°–2000° F. and at contact time of about 1–15 seconds, valuable co-products, e. g. acetylene and/or benzene, can be produced. Capital and operating economies may be realized by using chemical separation with molten sodium in place of physical separation as by absorption, adsorption or distillation. At the same time, disadvantages associated with formation of tars and coke through ineffective quenching are minimized.

I claim:

1. In processes for thermal conversion of hydrocarbon charge stocks, the method of quenching the hot conversion product stream and recovering substantially pure hydrogen therefrom which comprises: rapidly cooling said hot conversion product stream in an absorption zone by directly contacting said hot conversion product stream with a cool liquid contact medium comprising at least one metal selected from the group consisting of alkali and alkaline earth metals capable of forming an equilibrium metal hydride with hydrogen at elevated temperature; absorbing hydrogen from the cooled conversion product stream in the liquid contacting medium to form a fluid mixture of metal hydride and liquid contacting medium while maintaining a temperature less than the decomposition temperature of the metal hydride at the prevailing hydrogen partial pressure; separating the unabsorbed portion of the conversion product stream; withdrawing the fluid mixture from the absorption zone; recovering substantially pure hydrogen from the fluid mixture in a decomposition zone by adjusting the temperature-pressure relationship therein to provide a temperature greater than the decomposition temperature of metal hydride at the hydrogen pressure prevailing in said decomposition zone; withdrawing liquid contacting medium from the decomposition zone; cooling the liquid contacting medium to a temperature substantially below the temperature level in the conversion zone; and recycling said liquid contacting medium to the absorption zone.

2. The process of claim 1 in which the hydrocarbon stock charged to the thermal conversion process is methane.

3. The process of claim 1 in which the hydrocarbon stock charged to the thermal conversion process is ethane.

4. The process of claim 1 in which the hydrocarbon stock charged to the thermal conversion process is propane.

5. The process of claim 1 in which the contact medium in the absorption zone is maintained substantially in the liquid phase by limiting the concentration of metal hydride formed by hydrogen absorption in the molten mixture.

6. The process of claim 5 in which the contact medium comprises molten sodium metal.

7. The process of claim 1 in which the absorption zone comprises a vertically elongated vessel wherein the hot conversion product stream ascends in countercurrent contact with the descending molten liquid contact medium.

References Cited in the file of this patent

UNITED STATES PATENTS

| | | |
|---|---|---|
| 1,855,355 | Kloepfer | Apr. 26, 1932 |
| 1,956,259 | Terzian | Apr. 24, 1934 |
| 2,668,748 | Asbury | Feb. 9, 1954 |